(12) United States Patent
Horvath

(10) Patent No.: US 10,391,932 B2
(45) Date of Patent: Aug. 27, 2019

(54) ILLUMINATION UNIT

(71) Applicant: Magna Mirrors Holding GmbH, Sailauf (DE)

(72) Inventor: Thomas Horvath, Darmstadt (DE)

(73) Assignee: MAGNA MIRRORS HOLDING GMBH, Sailauf (DE)

( * ) Notice: Subject to any disclaimer, the term of this patent is extended or adjusted under 35 U.S.C. 154(b) by 0 days.

(21) Appl. No.: 15/839,168

(22) Filed: Dec. 12, 2017

(65) Prior Publication Data

US 2018/0170249 A1    Jun. 21, 2018

(30) Foreign Application Priority Data

Dec. 15, 2016    (DE) .......................... 10 2016 225 153

(51) Int. Cl.
| | |
|---|---|
| *B60Q 1/26* | (2006.01) |
| *B60Q 1/24* | (2006.01) |
| *B60Q 1/46* | (2006.01) |
| *F21S 41/20* | (2018.01) |
| *F21S 43/14* | (2018.01) |
| *F21S 43/27* | (2018.01) |
| *F21S 43/19* | (2018.01) |

(Continued)

(52) U.S. Cl.
CPC ............... *B60Q 1/46* (2013.01); *B60Q 1/24* (2013.01); *B60Q 1/2665* (2013.01); *B60R 1/06* (2013.01); *B60R 1/1207* (2013.01); *F21S 41/285* (2018.01); *F21S 43/14* (2018.01); *F21S 43/195* (2018.01); *F21S 43/26* (2018.01); *F21S 43/27* (2018.01); *F21V 17/101* (2013.01); *B60Q 2400/40* (2013.01); *F21Y 2115/10* (2016.08)

(58) Field of Classification Search
CPC ........................................................ B60Q 1/46
USPC ....................................................... 362/509
See application file for complete search history.

(56) References Cited

U.S. PATENT DOCUMENTS

| | | | |
|---|---|---|---|
| 5,788,357 A | 8/1998 | Muth et al. | |
| 9,930,444 B1* | 3/2018 | Stanley | H04R 1/025 |

(Continued)

FOREIGN PATENT DOCUMENTS

| | | |
|---|---|---|
| EP | 0584547 | 3/1994 |
| EP | 2481978 A1 | 8/2012 |

(Continued)

OTHER PUBLICATIONS

European Search Report dated May 4, 2018 from corresponding European Patent Application No. 17203657.6.

(Continued)

*Primary Examiner* — Allyson N Trail
(74) *Attorney, Agent, or Firm* — Honigman LLP

(57) ABSTRACT

An illumination unit for a vehicle component of a vehicle includes a housing and at least one light source that emits light through a light diffusion component and a light-deflecting film. The light-deflecting film is adapted to conform to an exterior contour of a vehicle component. The light-deflecting film closes the housing and has an inner side and an outer side, with the inner side closer to the light source than the outer side. The light-deflecting film has a microstructure on the outer side that deflects light emitted by the light source in a direction that differs from the angle of incidence of the emitted light at the inner side of the light-deflecting film.

20 Claims, 3 Drawing Sheets

(51) Int. Cl.
*F21S 43/20* (2018.01)
*B60R 1/06* (2006.01)
*B60R 1/12* (2006.01)
*F21V 17/10* (2006.01)
*F21Y 115/10* (2016.01)

(56) References Cited

U.S. PATENT DOCUMENTS

| | | | |
|---|---|---|---|
| 2004/0080958 A1 | 4/2004 | Bukosky et al. | |
| 2006/0253089 A1* | 11/2006 | Lin | A61F 9/0026 604/301 |
| 2014/0320823 A1* | 10/2014 | Ammar | B60R 1/12 353/13 |
| 2014/0333770 A1* | 11/2014 | Baur | B60R 1/00 348/148 |
| 2015/0224934 A1* | 8/2015 | Foote | B60Q 1/2665 340/425.5 |
| 2016/0078768 A1 | 3/2016 | Huizen et al. | |
| 2018/0009383 A1* | 1/2018 | Lynam | B60Q 1/2665 |
| 2018/0288848 A1* | 10/2018 | Gao | H05B 33/0884 |

FOREIGN PATENT DOCUMENTS

| | | |
|---|---|---|
| JP | 2005320004 A | 11/2005 |
| WO | 2011050982 A1 | 5/2011 |

OTHER PUBLICATIONS

German Search Report dated Sep. 22, 2017 from corresponding German Patent Application No. DE 102016225153.8.

* cited by examiner

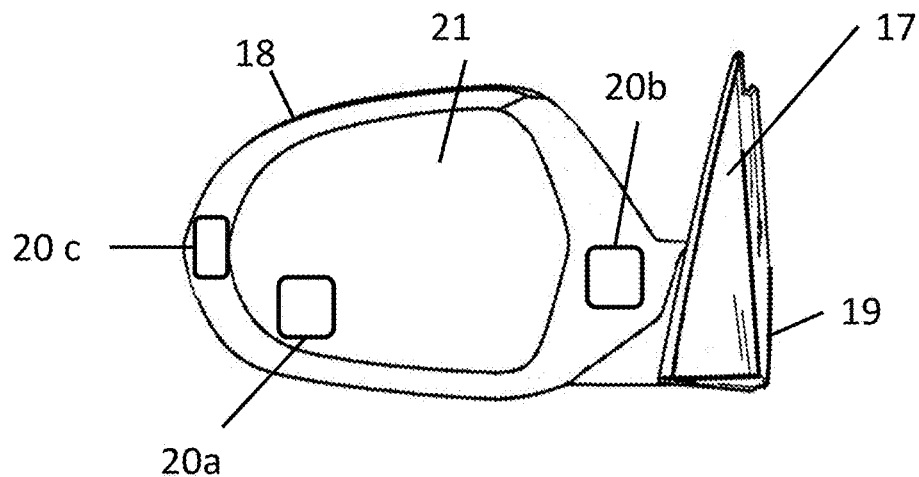
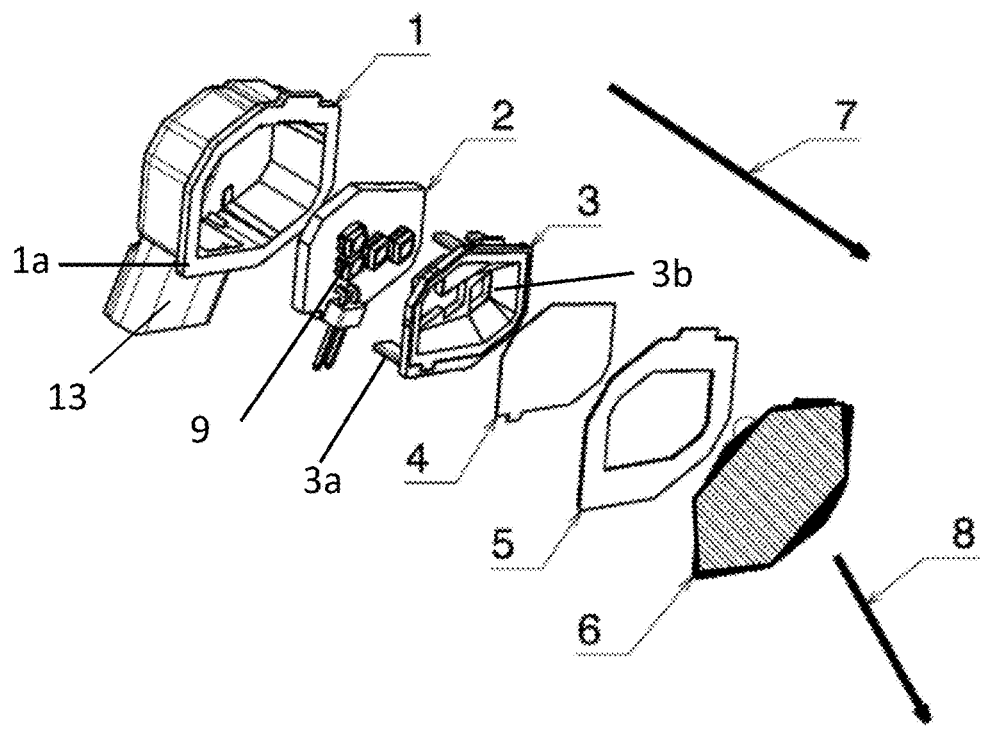

ILLUMINATION UNIT

CROSS REFERENCE TO RELATED APPLICATION

This application claims priority to DE 102016225153.8, filed Dec. 15, 2016, the entire disclosure of which is hereby incorporated herein by reference.

FIELD OF THE INVENTION

The invention relates to an illumination unit for use in the automotive sector. The illumination unit according to the invention is harmonically integrated in the contour of the vehicle.

BACKGROUND OF THE INVENTION

This section provides information related to the present disclosure which is not necessarily prior art.

A large number of luminaires in vehicles are known from the prior art. Various illumination units with different functions are attached both in the interior and to the outer contour of the vehicle.

In the interior, lamps for instruments and specific vehicle regions are present to provide illumination for the identification of operating elements or as lamps for reading or for ambient illumination. In order to provide a pleasant environment, regions such as the foot space, the armrest at the vehicle doors, operating elements, interior mirror or roof modules are illuminated at least when entering and exiting the vehicle.

Outside of the vehicle, lamps serve for marking in the form of a position lamp, as front or rear illumination, or as a flashing indicator of lane change or as a warning indicator for the driver.

Lamps need to meet specific requirements both inside and outside. First, the ability to meet regulations that define for example the luminance and indicator flash rates should be noted here. The spatial regions that are to be illuminated in the vicinity of the vehicle are likewise governed by regulations. In addition to licence conditions, the function and the design determine the appearance of the lamp.

An important parameter in the prior art is here that the lamp is attached such that it is concealed. That means that the cover plate that terminates the illumination unit towards the outside is matched to the environment in terms of colour shade or is tinted dark so as not to be noticeable.

In addition, the cover plate is intended to prevent a clear view of the technical components inside the illumination unit.

Depending on the location and purpose of use, the light from one or more light sources is intended to harmoniously illuminate the cover plate and to give a diffuse light impression. Alternatively, defined illumination of the environment of the vehicle or a light beam that is directed at a component of the interior is desired.

The prior art, U.S. Pat. No. 7,293,901 B2 describes an illumination element that has collimating optical elements and prismatic structures for beam deflection. Said collimating optical block is mounted in the luminaire. The light source provided is arranged at a distance of approximately 0.5 mm from the collimating unit, and therefore the notch depth of the prisms can be determined to approximately 0.15 mm.

EP 2500629 A1 discloses an illumination unit that has a closed housing. The light from the light-emitting means is emitted through the cover plate of the illumination unit. An optical film is applied on the inside of the cover plate. The optical film has either prismatic microstructures or exhibits a microlens structure.

It is therefore the objective of the present application to provide an illumination unit that emits the light in the desired form, without the need to take complicated and costly measures.

SUMMARY OF THE INVENTION

This section provides a general summary of the disclosure, and is not a comprehensive disclosure of its full scope or all of its features.

The object is achieved by way of an illumination unit having a housing, comprising at least one light source that emits its light through a light diffusion component and a light-deflecting film, wherein the light-deflecting film is adapted to the contour of a vehicle component, and wherein the at least one light-deflecting film has a microstructure on the outside that is remote from the light source, which microstructure deflects the diffusely incident light in a direction that differs from the angle of incidence, in a main preferential direction, and wherein the light-deflecting film closes the housing.

By omitting a cover plate, the construction of the illumination unit is simplified. In addition, the microstructure is provided on the outside and the light path after the deflection is thus deflected more directly onto the driver.

It is advantageous for the light-deflecting film to have a prismatic microstructure that permits simple deflection of the light.

The light-deflecting film is advantageously part of the vehicle contour.

It is advantageous if the light diffusion component is a light diffusion film that closes a light diffusion element, has openings for the light-emitting means and is arranged within the housing.

It is also advantageous if the light diffusion film is provided on one or both sides with a light diffusion layer or the material of the light diffusion film itself has light-scattering properties.

A further advantageous configuration is obtained if the light diffusion component is a light diffusion layer that is disposed in the light-deflecting film on the inside.

A further configuration has two or more light-deflecting films that are coupled to one another via further foams that are adhesive on two sides.

It is advantageous that the light-deflecting film closes the housing by way of a foam that is adhesive on two sides and is applied to the periphery of the housing.

The illumination unit is installed as a warning indicator in the exterior mirror.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The drawings described herein are for illustrative purposes only of selected embodiments and not all possible implementations, and are not intended to limit the scope of the present disclosure.

In the figures:

FIG. 1 shows an exterior mirror having a warning indicator;

FIG. 2 shows an illumination unit according to the invention;

DESCRIPTION OF THE PREFERRED EMBODIMENTS

Figure 3:
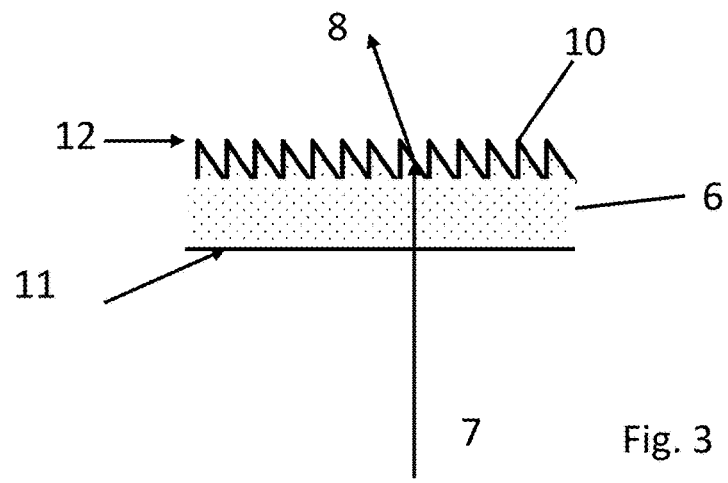
FIG. 3 shows details of the embodiment according to FIG. 2.

FIG. 1 shows an exterior mirror arrangement having a mirror base 17 and a mirror head 18. The mirror head 18 is generally arranged to be rotatable with respect to the mirror base 17. The mirror base is attached to the vehicle 19. FIG. 1 depicts a plurality of possible installation sites for illumination units. The positions are designated with the reference 20.

The illumination units according to the invention are illuminated, depending on the function, as harmoniously illuminated light regions. A warning indicator of a driver assistance system is attached at the position 20a or at another position of the exterior mirror that is accessible to the driver. The indicator is illuminated in the case of danger. In that case, the warning indicator is illuminated completely and virtually uniformly with good visibility for the driver.

If the light of the illumination unit is intended to be emitted in a directional manner, measures must be taken that result in a deflection of the emitted light beams.

At the installation position 20b of the illumination unit, illumination of a region next to the vehicle and the function as a puddle lamp are possible. The light of the puddle lamp is emitted downwardly at an angle. Illumination of the door and of the entrance region is also feasible. The installation position 20a is located behind a mirror glass 21, wherein at least one region of the mirror glass is designed to be transparent for the light from the illumination unit.

FIG. 2 shows an illumination unit as is installed in an exterior mirror as the warning indicator of a driver assistance system. Such a module is incorporated, for example, in the side wall of a mirror housing that is visible by the driver or arranged behind the mirror glass. The illumination module for example illuminates upon a control signal of a driver assistance system if a vehicle approaches in the blind spot region. The illumination module itself comprises a housing 1, which is configured such that the further components are accommodated therein. The illumination unit does not necessarily need to be closed in a watertight manner, it can be advantageous for the module not to be sealed off and for air convection towards the outside to be permitted. Installed inside the housing 1 is a printed circuit board 2 with light-emitting means 9 on the housing rear wall of the housing 1. A light diffusion element 3 made of white plastics material acts as a hold-down for the printed circuit board 2 and fixes the printed circuit board in the housing 1 via suitable bars 3a. The light diffusion element 3 has openings 3b through which the light-emitting means 9, the LEDs, radiate or are plugged in a manner such that the LED-bodies are surrounded and guided by the openings 3b.

A light diffusion film 4 with a light diffusion layer that is situated outside in the direction of the main light propagation 7 closes the light diffusion element 3.

Said light diffusion film can be provided on one or both sides with a light diffusion layer, or the material of the light diffusion film itself has light-scattering properties.

Attached on the periphery 1a of the housing 1 is a seal in the form of a foam ring 5 that is adhesive on both sides. A light-deflecting film 6 forms the final part.

The light-deflecting film 6 has an outside structure 10 (FIG. 3) that faces in the direction 7 and directs the diffuse light in a direction towards the driver. The light-deflecting film is adhesively placed along the outer contour of the illumination unit by way of the foam ring 5 that is adhesive on both sides and the housing is closed by way of the film. The light-deflecting film thus forms the cover of the housing, and no further component for closing is necessary. The light-deflecting film 6 adapts in terms of its shape to the contour of the component in which the luminaire is arranged. Suitable material for the light-deflecting film is PC or another optically clear plastic such as PMMA.

The electric terminal is realized by way of a plug 13.

Prismatic optical films are known, for example, from U.S. Pat. No. 7,763,331 B2. In display technology, they serve for harmoniously distributing the light of the background illumination. The prismatic film, mentioned by way of example, comprises a plastics material, wherein the carrier material can be identical to or different from the applied material for the structure. It is important to select a UV-resistant plastic that does not age too much when used outside the vehicle. Use of this plastic thus allows for the microstructure 10 to be moved to the outside and for a light path that is not disrupted up to the microstructure 10 to be produced. The deflected light beams in the direction 8 can, but do not necessarily have to, pass through further optically relevant layers.

Figure 6:
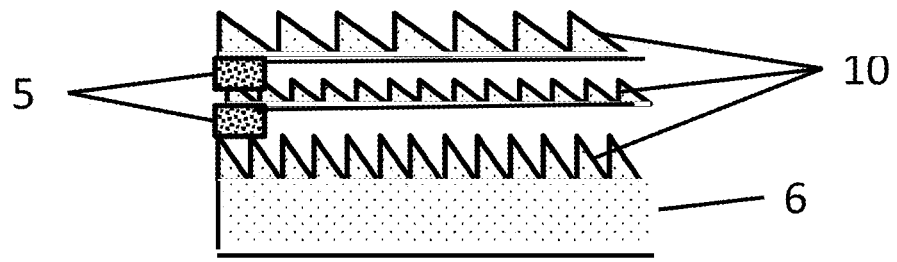
FIG. 6 shows an embodiment with a plurality of films.

In order to achieve an even stronger deflection of the light in a specific main preferential direction, two or more light-deflecting films can be coupled together via a further foam ring that is adhesive on both sides, as is roughly shown in FIG. 6. Here, a plurality of layers of light-deflecting films are stacked and adhesively arranged along the periphery. The carrier material for the microstructure is only indicated in the schematic illustration.

Due to the low thickness of the light-deflecting film, it disrupts the optical properties of the illumination unit only to a very small degree. The structure of the film is no longer resolvable by the eye.

The light from the LEDs is diffusely scattered and incident on the flat, non-structured internal side 11 of the light-deflecting film 6. The light passes through the light-deflecting film and reaches the structure of the outside 12 and is refracted in a direction 8 in dependence on the angle of incidence of the light. The structure is here preferably composed of prismatic shapes that are produced with different prism shapes and prism angles between 70 and 120 degrees.

Figure 4:
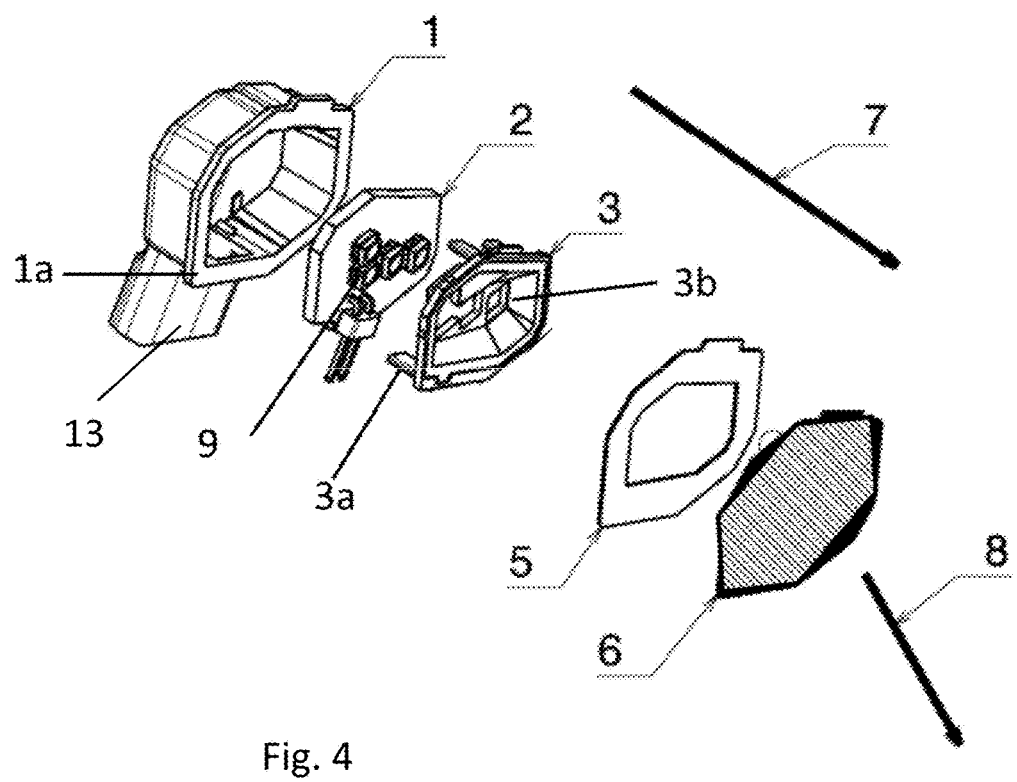
FIG. 4 shows an alternative embodiment.
Figure 5:
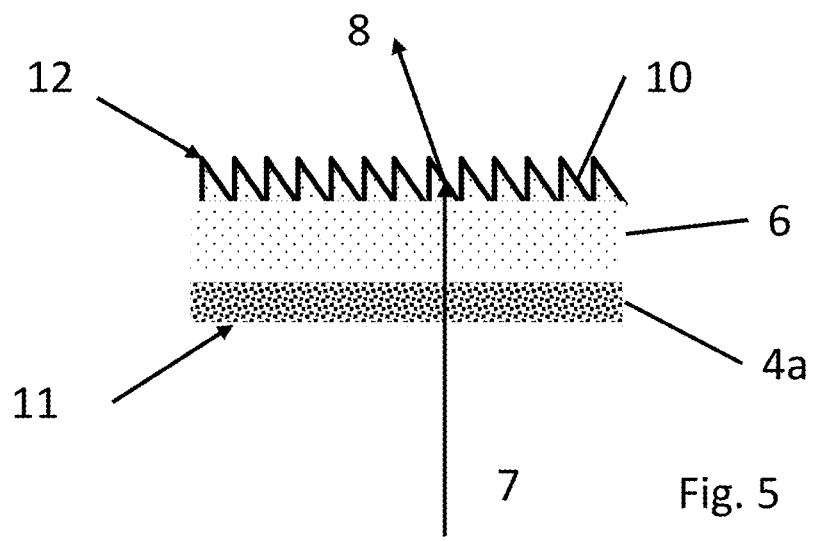
FIG. 5 shows a detail of the embodiment according to FIG. 4.

FIG. 4 illustrates a further embodiment. In this embodiment, the light diffusion element is no longer closed by a light diffusion film. Rather, the function of light diffusion is performed, as shown in FIG. 5, by a light diffusion layer 4a that is integrated in the light-deflecting film 6. As a result, all functions, specifically the diffuse scattering of the light and the deflection of the light, are performed by a component which additionally also tightly closes off the housing of the illumination unit in the form of a cover.

LIST OF REFERENCE SIGNS

1: housing
1a: periphery

2: printed circuit board
3: light diffusion element
3a: bars
3b: openings
4: light diffusion film
4a: light diffusion layer
5: foam
6: light-deflecting film
7: light propagation
8: light propagation after light deflection
9: light-emitting means
10: optical microstructure
11: internal side
12: outside
13: plug
17: mirror base
18: mirror head
19: vehicle
20a,b,c: installation positions

The invention claimed is:

1. An illumination unit for a vehicle component of a vehicle, the illumination unit comprising:
  a housing;
  at least one light source that emits light through a light diffusion component and a light-deflecting film;
  wherein the light-deflecting film is adapted to conform to an exterior contour of a vehicle component;
  wherein the light-deflecting film has an inner side and an outer side, and wherein the inner side is closer to the light source than the outer side; and
  wherein the light-deflecting film has a microstructure on the outer side of the light-deflecting film, and wherein the microstructure deflects light emitted by the light source in a direction that differs from the angle of incidence of the emitted light at the inner side of the light-deflecting film, and wherein the light-deflecting film closes the housing.

2. The illumination unit according to claim 1, wherein the light-deflecting film has a prismatic microstructure.

3. The illumination unit according to claim 1, wherein the light-deflecting film is part of the exterior contour of the vehicle component.

4. The illumination unit according to claim 1, wherein the light diffusion component comprises a light diffusion film that closes a light diffusion element, which has openings for the light source and is arranged within the housing.

5. The illumination unit according to claim 4, wherein the light diffusion film is provided with a light diffusion layer on one or both sides.

6. The illumination unit according to claim 4, wherein a material of the light diffusion film has light-scattering properties.

7. The illumination unit according to claim 1, wherein the light diffusion component comprises a light diffusion layer at the inner side of the light-deflecting film.

8. The illumination unit according to claim 7, wherein the light-deflecting film comprises two or more light-deflecting films coupled together by way of further foam rings that have adhesive at both surfaces thereof.

9. The illumination unit according to claim 1, wherein the light-deflecting film closes the housing by way of a foam ring that has adhesive at both of its surfaces and is deposited at a periphery of the housing.

10. The illumination unit according to claim 1, wherein the illumination unit is installed as a warning indicator at an exterior mirror of the vehicle.

11. The illumination unit according to claim 10, wherein the warning indicator is arranged at an inner wall of an exterior mirror housing of the exterior mirror that faces a driver of the vehicle.

12. The illumination unit according to claim 10, wherein the at least one light source is actuated responsive to a control signal of a driver assistance system of the vehicle when another vehicle approaches in a blind spot region.

13. The illumination unit according to claim 1, wherein the illumination unit is installed as a puddle lamp for the vehicle.

14. An illumination unit for an exterior rearview mirror of a vehicle, the illumination unit comprising:
  a housing configured to be disposed in an exterior rearview mirror of a vehicle equipped with the illumination unit;
  a printed circuit board disposed in the housing;
  a light source disposed at the printed circuit board and operable, when electrically powered, to emit light, wherein the light source comprises a plurality of light emitting diodes;
  a light diffusion component disposed in the housing and having apertures that are aligned with respective ones of the light emitting diodes;
  wherein the housing has an outer open end for receiving the printed circuit board and light diffusion component in the housing;
  a light-deflecting film at the outer open end of the housing, wherein the light-deflecting film has an inner side and an outer side, and wherein the inner side is closer to the light source than the outer side;
  wherein the light-deflecting film closes the outer open end of the housing;
  wherein the light-deflecting film is adapted to conform to an exterior contour of a mirror casing of the exterior rearview mirror; and
  wherein the light-deflecting film has a microstructure at the outer side of the light-deflecting film, and wherein the microstructure deflects light emitted by the light source in a direction that differs from the angle of incidence of the emitted light at the inner side of the light-deflecting film.

15. The illumination unit according to claim 14, wherein the light diffusion component comprises a light diffusion element and a light diffusion film that closes an open end of the light diffusion element, wherein the light diffusion element comprises the apertures that are aligned with respective ones of the light emitting diodes.

16. The illumination unit according to claim 14, wherein the light-deflecting film is attached at the outer open end of the housing by a foam ring that adhesively attaches to the inner side of the light-deflecting film and to the outer open end of the housing, wherein the foam ring is disposed at a periphery of the outer open end of the housing.

17. The illumination unit according to claim 14, wherein the illumination unit comprises a warning indicator at the exterior rearview mirror of the vehicle, and wherein the light source is electrically powered responsive to a control signal of a driver assistance system of the vehicle when another vehicle approaches in a blind spot region.

18. An illumination unit for an exterior rearview mirror of a vehicle, the illumination unit comprising:
  a housing configured to be disposed in an exterior rearview mirror of a vehicle equipped with the illumination unit;
  a printed circuit board disposed in the housing;

a light source disposed at the printed circuit board and operable, when electrically powered, to emit light, wherein the light source comprises a plurality of light emitting diodes;

a light diffusion component disposed in the housing and having apertures that are aligned with respective ones of the light emitting diodes;

wherein the housing comprises a connector portion, and wherein the printed circuit board includes terminals electrically connected to the light emitting diodes, and wherein the terminals are disposed in the connector portion, and wherein the connector portion is configured to electrically connect to a connector of a wire harness of the exterior rearview mirror when the housing is disposed in the exterior rearview mirror;

wherein the housing has an outer open end for receiving the printed circuit board and light diffusion component in the housing;

a light-deflecting film at the outer open end of the housing, wherein the light-deflecting film has an inner side and an outer side, and wherein the inner side is closer to the light source than the outer side;

wherein the light-deflecting film closes the outer open end of the housing;

wherein the light-deflecting film is attached at the outer open end of the housing by a foam ring that adhesively attaches to the inner side of the light-deflecting film and to the outer open end of the housing, and wherein the foam ring is disposed at a periphery of the outer open end of the housing;

wherein the light-deflecting film and the foam ring conform so that the light-deflecting film conforms to an exterior contour of the exterior rearview mirror when the housing is disposed in the exterior rearview mirror;

wherein the light-deflecting film has a microstructure at the outer side of the light-deflecting film, and wherein the microstructure deflects light emitted by the light source in a direction that differs from the angle of incidence of the emitted light at the inner side of the light-deflecting film; and wherein the illumination unit comprises a warning indicator at the exterior rearview mirror of the vehicle, and wherein the light source is electrically powered responsive to a control signal of a driver assistance system of the vehicle when another vehicle approaches in a blind spot region.

19. The illumination unit according to claim 18, wherein the light-deflecting film comprises a film layer with a first microstructure disposed at the outer side of the light-deflecting film and a second microstructure disposed between the first microstructure and the film layer, and wherein the first microstructure is coupled to the second microstructure via a first foam ring, and wherein the second microstructure is coupled to the first microstructure via a second foam ring.

20. The illumination unit according to claim 18, wherein the light diffusion component comprises a light diffusion element and a light diffusion film that closes an open end of the light diffusion element, wherein the light diffusion element comprises the apertures that are aligned with respective ones of the light emitting diodes.

\* \* \* \* \*